United States Patent
Joung et al.

(10) Patent No.: US 10,027,428 B2
(45) Date of Patent: Jul. 17, 2018

(54) METHOD OF CALIBRATING POWER FOR MIMO-OFDM TRANSMITTER

(71) Applicant: INNOWIRELESS CO., LTD., Seongnam-si, Gyeonggi-do (KR)

(72) Inventors: Jin Soup Joung, Seongnam-si (KR); Joo Hyeong Lee, Seoul (KR); Yong Hoon Lim, Seoul (KR); Byung Kwan Jang, Yongin-si (KR)

(73) Assignee: INNOWIRELESS CO., LTD., Seongnam-si (KR)

( * ) Notice: Subject to any disclaimer, the term of this patent is extended or adjusted under 35 U.S.C. 154(b) by 83 days.

(21) Appl. No.: 15/050,007

(22) Filed: Feb. 22, 2016

(65) Prior Publication Data
US 2017/0214477 A1    Jul. 27, 2017

(30) Foreign Application Priority Data
Jan. 25, 2016    (KR) .................. 10-2016-0008679

(51) Int. Cl.
| H04B 7/0413 | (2017.01) |
| H04B 17/13 | (2015.01) |
| H04J 11/00 | (2006.01) |

(52) U.S. Cl.
CPC ........... *H04B 17/13* (2015.01); *H04B 7/0413* (2013.01); *H04J 11/00* (2013.01)

(58) Field of Classification Search
CPC .......... H04B 7/02; H04B 7/024; H04B 7/028; H04B 7/0404; H04B 7/0413;
(Continued)

(56) References Cited

U.S. PATENT DOCUMENTS

| 6,535,552 B1 * | 3/2003 | Pessoa ............ H04L 25/03159 370/292 |
| 6,842,487 B1 * | 1/2005 | Larsson ............ H04B 7/0671 375/260 |

(Continued)

FOREIGN PATENT DOCUMENTS

| CN | 101296012 A | * 10/2008 |
| CN | 101296012 B | * 6/2013 |

(Continued)

OTHER PUBLICATIONS

Dammann et al., An Overview of Cyclic Delay Diversity and its Applications, Sep. 14, 2008, Vehicular Technology Conference, 2008. VTC 2008-Fall. IEEE 68th (Year: 2008).*

(Continued)

*Primary Examiner* — Eric Nowlin
(74) *Attorney, Agent, or Firm* — Novick, Kim & Lee, PLLC; Jae Youn Kim

(57) ABSTRACT

Provided is a method of calibrating a power for a multiple input and multiple output-orthogonal frequency division multiplexing transmitter having a plurality of antennas via a measurement equipment, the method including: receiving a cyclic delay diversity (CDD) signal simultaneously output from the transmitter to obtain a starting point of a frame of a corresponding signal; performing a fast Fourier transform on a sample proceeded from the starting point by an extent of a maximum CDD delay; calculating a channel coefficient; calculating a channel impulse response and a power of the channel impulse response; converting CDD delay values of each antenna into values in units of samples by using a sampling rate in the channel impulse response; mapping a peak point position of the channel impulse response to each antenna using CDD delay sample values; and simultane- (Continued)

ously performing a power calibration of each antenna based on each peak point power.

4 Claims, 4 Drawing Sheets

(58) Field of Classification Search
CPC .. H04B 7/0452; H04B 7/0495; H04B 7/0667; H04B 17/13; H04B 7/0615; H04B 7/0671; H04L 5/0048; H04L 5/005; H04L 5/0051; H04L 25/0226; H04L 27/2602; H04L 27/2607; H04L 27/2626; H04J 11/00

See application file for complete search history.

(56) References Cited

U.S. PATENT DOCUMENTS

| | | | | |
|---|---|---|---|---|
| 7,149,239 | B2* | 12/2006 | Hudson | H04L 1/0618 375/144 |
| 7,180,965 | B2* | 2/2007 | Eilts | H04L 25/0212 375/226 |
| 7,711,061 | B2* | 5/2010 | Trachewsky | H04L 1/0006 370/465 |
| 7,729,432 | B2* | 6/2010 | Khan | H04B 7/0671 375/260 |
| 7,809,097 | B2* | 10/2010 | Wang | H04L 27/2656 375/149 |
| 7,953,039 | B2* | 5/2011 | Khan | H04B 7/0671 370/329 |
| 7,978,780 | B2* | 7/2011 | Azizi | H04B 7/0671 375/260 |
| 8,121,632 | B2* | 2/2012 | Sambhwani | H04J 11/0069 455/525 |
| 8,149,930 | B2* | 4/2012 | Nakao | H04L 1/06 375/260 |
| 8,194,774 | B2* | 6/2012 | Hochwald | H04B 7/0671 370/252 |
| 8,224,263 | B2* | 7/2012 | Nogami | H04B 7/0671 370/208 |
| 8,259,631 | B2* | 9/2012 | Hwang | H04L 27/2626 370/310 |
| 8,289,866 | B2* | 10/2012 | Sambhwani | H04W 52/16 370/252 |
| 8,369,395 | B2* | 2/2013 | Kim | H04B 17/0085 375/224 |
| 8,433,251 | B2* | 4/2013 | Chen | H04L 5/001 370/255 |
| 8,446,967 | B2* | 5/2013 | Chrabieh | H04L 27/2613 375/260 |
| 8,472,965 | B2* | 6/2013 | Zhang | H04L 5/0037 455/451 |
| 8,503,460 | B2* | 8/2013 | Ahmavaara | H04W 8/065 370/254 |
| 8,509,710 | B2* | 8/2013 | Kim | H04B 7/0671 375/299 |
| 8,514,721 | B2* | 8/2013 | Luo | H04L 1/1822 370/241 |
| 8,514,794 | B2* | 8/2013 | Zhang | H04W 52/286 370/329 |
| 8,521,207 | B2* | 8/2013 | Zhang | H04W 52/286 455/452.2 |
| 8,532,213 | B2* | 9/2013 | Trachewsky | H04L 1/0006 370/465 |
| 8,559,298 | B2* | 10/2013 | Catovic | H04W 36/0083 370/216 |
| 8,565,193 | B2* | 10/2013 | Ylitalo | H01Q 1/246 370/252 |
| 8,582,519 | B2* | 11/2013 | Khan | H04B 7/0671 370/329 |
| 8,619,544 | B2* | 12/2013 | Gaal | H04J 13/00 370/209 |
| 8,619,684 | B2* | 12/2013 | Meylan | H04W 28/06 370/280 |
| 8,625,724 | B2* | 1/2014 | Song | H04B 17/309 375/260 |
| 8,654,623 | B2* | 2/2014 | Luo | H04J 11/0069 307/328 |
| 8,660,600 | B2* | 2/2014 | Khandekar | H04W 52/146 455/115.4 |
| 8,675,761 | B2* | 3/2014 | Tujkovic | H04B 7/0671 375/267 |
| 8,676,133 | B2* | 3/2014 | Montojo | H04W 72/1273 370/208 |
| 8,687,568 | B2* | 4/2014 | Montojo | H04K 1/00 370/329 |
| 8,687,719 | B2* | 4/2014 | Debbah | H04J 11/003 375/135 |
| 8,705,575 | B2* | 4/2014 | Jongren | H04L 1/1635 370/479 |
| 8,730,854 | B2* | 5/2014 | Luo | H04L 27/2607 370/310 |
| 8,730,939 | B2* | 5/2014 | Miyoshi | H04J 13/10 370/350 |
| 8,731,087 | B2* | 5/2014 | Yuan | H04B 7/024 370/334 |
| 8,737,189 | B2* | 5/2014 | Hansen | H04B 7/02 370/203 |
| 8,744,513 | B2* | 6/2014 | Chen | H04W 52/367 455/120 |
| 8,780,771 | B2* | 7/2014 | Kim | H04B 7/0671 370/310 |
| 8,780,790 | B2* | 7/2014 | Sarkar | H04L 5/14 370/280 |
| 8,837,393 | B2* | 9/2014 | Han | H04B 7/0669 370/329 |
| 8,867,999 | B2* | 10/2014 | Agrawal | H04W 72/082 455/296 |
| 8,891,597 | B1* | 11/2014 | Zhang | H04B 7/0617 375/220 |
| 8,898,448 | B2* | 11/2014 | Klingenbrunn | H04L 47/10 370/394 |
| 8,908,582 | B2* | 12/2014 | Damnjanovic | H04W 52/367 370/311 |
| 8,917,593 | B2* | 12/2014 | Damnjanovic | H04W 56/0045 370/228 |
| 8,923,249 | B2* | 12/2014 | Kim | H04L 25/03866 370/208 |
| 8,923,905 | B2* | 12/2014 | Montojo | H04B 7/024 455/507 |
| 8,934,326 | B2* | 1/2015 | Bhattad | H04J 11/005 370/201 |
| 8,964,874 | B2* | 2/2015 | Yuan | H04B 7/024 370/334 |
| 8,971,178 | B1* | 3/2015 | Nabar | H04J 3/16 370/220 |
| 8,971,428 | B2* | 3/2015 | Lakhzouri | G01S 5/0273 375/260 |
| 8,971,429 | B2* | 3/2015 | Zhang | G01S 5/0205 375/260 |
| 8,982,997 | B2* | 3/2015 | Jia | H04B 7/0667 332/106 |
| 9,001,774 | B2* | 4/2015 | Khan | H04B 7/0671 370/329 |
| 9,060,287 | B2* | 6/2015 | Mellein | H04W 24/02 |
| 9,113,429 | B2* | 8/2015 | Maheshwari | H04L 1/189 |
| 9,154,969 | B1* | 10/2015 | Srinivasa | H04W 24/00 |
| 9,160,437 | B2* | 10/2015 | Ajima | H04B 7/0456 |
| 9,166,849 | B2* | 10/2015 | Chen | H04B 7/024 |
| 9,225,478 | B2* | 12/2015 | Chen | H04W 28/08 |
| 9,232,529 | B2* | 1/2016 | Song | H04W 72/085 |
| 9,237,545 | B2* | 1/2016 | Garin | H04W 4/023 |
| 9,277,556 | B2* | 3/2016 | Nakamura | H04B 7/0413 |
| 9,288,021 | B2* | 3/2016 | Zhang | H04L 1/1614 |
| 9,319,904 | B1* | 4/2016 | Srinivasa | H04W 24/02 |
| 9,331,757 | B2* | 5/2016 | Nazar | H04B 7/022 |
| 9,332,582 | B2* | 5/2016 | Ulupinar | H04W 76/025 |
| 9,363,001 | B2* | 6/2016 | Bhattad | H04B 7/0486 |

(56) References Cited

U.S. PATENT DOCUMENTS

| | | | |
|---|---|---|---|
| 9,369,252 B2* | 6/2016 | Damnjanovic | H04L 5/005 |
| 9,392,588 B2* | 7/2016 | Zhang | H04L 1/1614 |
| 9,444,577 B1* | 9/2016 | Zhang | H04L 1/0026 |
| 9,461,859 B2* | 10/2016 | Gorokhov | H04B 1/715 |
| 9,485,063 B2* | 11/2016 | Shattil | H04B 7/026 |
| 9,497,641 B2* | 11/2016 | Garin | H04L 37/0671 |
| 9,509,406 B2* | 11/2016 | Tanaka | H04B 10/2575 |
| 9,521,554 B2* | 12/2016 | Farajidana | H04W 16/10 |
| 9,674,800 B2* | 6/2017 | Zhang | H04W 52/346 |
| 9,685,702 B2* | 6/2017 | Hu | H04B 7/0408 |
| 9,768,842 B2* | 9/2017 | Shattil | H04B 7/026 |
| 9,787,376 B2* | 10/2017 | Zhu | H04B 7/0456 |
| 2002/0176485 A1* | 11/2002 | Hudson | H04L 1/0618 375/144 |
| 2003/0043887 A1* | 3/2003 | Hudson | H04L 1/0618 375/144 |
| 2003/0108127 A1* | 6/2003 | Eilts | H04L 25/0212 375/340 |
| 2007/0047666 A1* | 3/2007 | Trachewsky | H04L 1/0006 375/267 |
| 2007/0098097 A1* | 5/2007 | Khan | H04B 7/0671 375/260 |
| 2007/0098101 A1* | 5/2007 | Kondylis | H04B 7/0671 375/260 |
| 2007/0183533 A1* | 8/2007 | Schmidl | H04L 1/0003 375/299 |
| 2007/0206687 A1* | 9/2007 | Ananth | H04L 25/0232 375/260 |
| 2007/0217524 A1* | 9/2007 | Wang | H04L 27/2656 375/260 |
| 2007/0274411 A1* | 11/2007 | Lee | H04B 7/0456 375/267 |
| 2008/0132282 A1* | 6/2008 | Liu | H04B 7/0671 455/562.1 |
| 2008/0137788 A1* | 6/2008 | Bang | H04L 25/0236 375/350 |
| 2008/0247364 A1* | 10/2008 | Kim | H04B 7/0671 370/336 |
| 2008/0273452 A1* | 11/2008 | Khan | H04B 7/0669 370/203 |
| 2009/0067531 A1* | 3/2009 | Lee | H04B 7/0417 375/267 |
| 2009/0080543 A1* | 3/2009 | Azizi | H04B 7/0671 375/260 |
| 2009/0116575 A1* | 5/2009 | Hochwald | H04B 7/0671 375/267 |
| 2009/0141620 A1* | 6/2009 | Hwang | H04L 27/2626 370/210 |
| 2009/0180435 A1* | 7/2009 | Sarkar | H04L 5/14 370/330 |
| 2009/0197546 A1* | 8/2009 | Kim | H04B 7/0671 455/101 |
| 2009/0203376 A1* | 8/2009 | Sambhwani | H04J 11/0069 455/434 |
| 2009/0213946 A1* | 8/2009 | Dick | G06F 17/5054 375/260 |
| 2009/0225646 A1* | 9/2009 | Dayal | H04B 7/0671 370/204 |
| 2009/0232309 A1* | 9/2009 | Montojo | H04K 1/00 380/270 |
| 2009/0238099 A1* | 9/2009 | Ahmavaara | H04W 8/065 370/254 |
| 2009/0249027 A1* | 10/2009 | Kim | H04L 25/03866 712/5 |
| 2009/0252052 A1* | 10/2009 | Sambhwani | H04W 52/16 370/252 |
| 2009/0274077 A1* | 11/2009 | Meylan | H04W 28/06 370/280 |
| 2009/0274109 A1* | 11/2009 | Zhang | H04L 1/1614 370/329 |
| 2009/0274112 A1* | 11/2009 | Ma | H04L 1/06 370/330 |
| 2009/0316807 A1* | 12/2009 | Kim | H04B 7/061 375/260 |
| 2009/0316904 A1* | 12/2009 | Klingenbrunn | H04L 47/10 380/274 |
| 2009/0318153 A1* | 12/2009 | Maheshwari | H04L 1/189 455/436 |
| 2009/0323638 A1* | 12/2009 | Catovic | H04W 36/0083 370/331 |
| 2009/0323957 A1* | 12/2009 | Luo | H04J 11/0069 380/270 |
| 2010/0034141 A1* | 2/2010 | Meylan | H04W 74/0833 370/328 |
| 2010/0041411 A1* | 2/2010 | Mallik | H04W 88/08 455/450 |
| 2010/0042716 A1* | 2/2010 | Farajidana | H04W 16/10 709/224 |
| 2010/0075706 A1* | 3/2010 | Montojo | H04B 7/0691 455/513 |
| 2010/0091915 A1* | 4/2010 | Xu | H04B 7/0671 375/343 |
| 2010/0158088 A1* | 6/2010 | Kim | H04B 17/0085 375/224 |
| 2010/0172423 A1* | 7/2010 | Chrabieh | H04L 27/2613 375/260 |
| 2010/0190447 A1* | 7/2010 | Agrawal | H04W 48/08 455/63.1 |
| 2010/0197264 A1* | 8/2010 | Azadet | H04L 1/0631 455/272 |
| 2010/0202331 A1* | 8/2010 | Zhang | H04W 52/286 370/310 |
| 2010/0220798 A1* | 9/2010 | Trachewsky | H04L 1/0006 375/260 |
| 2010/0232311 A1* | 9/2010 | Zhang | H04L 5/0007 370/252 |
| 2010/0232384 A1* | 9/2010 | Farajidana | H04L 5/005 370/329 |
| 2010/0232488 A1* | 9/2010 | Song | H04B 17/21 375/224 |
| 2010/0234061 A1* | 9/2010 | Khandekar | H04W 52/146 455/522 |
| 2010/0238825 A1* | 9/2010 | Zhang | H04W 52/286 370/252 |
| 2010/0238904 A1* | 9/2010 | Zhang | H04L 5/0023 370/333 |
| 2010/0322090 A1* | 12/2010 | Zhang | H04W 52/346 370/252 |
| 2011/0033012 A1* | 2/2011 | Matsuoka | H04L 25/022 375/340 |
| 2011/0044188 A1* | 2/2011 | Luo | H04L 27/2607 370/252 |
| 2011/0051835 A1* | 3/2011 | Yuan | H04B 7/024 375/267 |
| 2011/0076962 A1* | 3/2011 | Chen | H04L 5/001 455/68 |
| 2011/0077038 A1* | 3/2011 | Montojo | H04B 7/024 455/507 |
| 2011/0103247 A1* | 5/2011 | Chen | H04B 7/0452 370/252 |
| 2011/0103395 A1* | 5/2011 | Ratnakar | H04L 47/568 370/412 |
| 2011/0116562 A1* | 5/2011 | Li | H04L 27/0014 375/260 |
| 2011/0122819 A1* | 5/2011 | Jongren | H04L 1/1635 370/328 |
| 2011/0141876 A1* | 6/2011 | Kuchi | H04B 7/0413 370/203 |
| 2011/0141901 A1* | 6/2011 | Luo | H04L 1/1822 370/241 |
| 2011/0199921 A1* | 8/2011 | Damnjanovic | H04W 52/367 370/252 |
| 2011/0211652 A1* | 9/2011 | Debbah | H04J 11/003 375/295 |
| 2011/0223870 A1* | 9/2011 | Tujkovic | H04B 7/0671 455/73 |
| 2011/0228748 A1* | 9/2011 | Han | H04B 7/0669 370/335 |

(56) References Cited

U.S. PATENT DOCUMENTS

| | | | | |
|---|---|---|---|---|
| 2011/0255434 A1* | 10/2011 | Ylitalo | H01Q 1/246 | 370/252 |
| 2011/0270994 A1* | 11/2011 | Ulupinar | H04W 76/025 | 709/227 |
| 2011/0319120 A1* | 12/2011 | Chen | H04W 52/367 | 455/522 |
| 2012/0063302 A1* | 3/2012 | Damnjanovic | H04W 74/0833 | 370/228 |
| 2012/0077519 A1* | 3/2012 | Suh | H04B 7/0671 | 455/456.1 |
| 2012/0087401 A1* | 4/2012 | Bhattad | H04B 7/0486 | 375/224 |
| 2012/0093139 A1* | 4/2012 | Hooli | H04L 1/0618 | 370/337 |
| 2012/0093258 A1* | 4/2012 | Suh | H04B 7/0671 | 375/295 |
| 2012/0275530 A1* | 11/2012 | Nazar | H04B 7/022 | 375/267 |
| 2012/0281552 A1* | 11/2012 | Niu | H04B 7/063 | 370/252 |
| 2012/0307928 A1* | 12/2012 | Jia | H04B 7/0667 | 375/267 |
| 2013/0100914 A1* | 4/2013 | Nakamura | H04B 7/0413 | 370/329 |
| 2013/0114438 A1* | 5/2013 | Bhattad | H04J 11/005 | 370/252 |
| 2013/0257655 A1* | 10/2013 | Hu | H04B 7/0408 | 342/373 |
| 2014/0003240 A1* | 1/2014 | Chen | H04W 28/08 | 370/235 |
| 2014/0016714 A1* | 1/2014 | Chen | H04B 7/024 | 375/260 |
| 2014/0059662 A1* | 2/2014 | Zhu | H04L 9/3271 | 726/6 |
| 2014/0119223 A1* | 5/2014 | Song | H04W 72/085 | 370/252 |
| 2014/0133373 A1* | 5/2014 | Han | H04L 1/1861 | 370/281 |
| 2014/0192919 A1* | 7/2014 | Montojo | H04B 7/0691 | 375/267 |
| 2014/0211701 A1* | 7/2014 | Damnjanovic | H04L 5/005 | 370/329 |
| 2014/0211879 A1* | 7/2014 | Yuan | H04B 7/024 | 375/267 |
| 2014/0254405 A1* | 9/2014 | Mellein | H04W 24/02 | 370/252 |
| 2014/0254504 A1* | 9/2014 | Bashar | H04L 5/0048 | 370/329 |
| 2014/0308976 A1* | 10/2014 | Garin | H04W 4/023 | 455/456.2 |
| 2014/0334434 A1* | 11/2014 | Bhattad | H04J 11/005 | 370/329 |
| 2015/0003397 A1* | 1/2015 | Agrawal | H04W 48/08 | 370/329 |
| 2015/0003398 A1* | 1/2015 | Agrawal | H04W 48/08 | 370/329 |
| 2015/0023453 A1* | 1/2015 | Ajima | H04B 7/0456 | 375/340 |
| 2015/0085948 A1* | 3/2015 | Bhattad | H04B 7/0486 | 375/267 |
| 2015/0341942 A1* | 11/2015 | Lee | H04B 7/0626 | 370/252 |
| 2016/0081072 A1* | 3/2016 | Zhang | H04L 1/1614 | 370/280 |
| 2016/0094318 A1* | 3/2016 | Shattil | H04B 7/026 | 375/267 |
| 2016/0261328 A1* | 9/2016 | Kim | H04B 7/0632 | |
| 2016/0269154 A1* | 9/2016 | Damnjanovic | H04L 5/005 | |
| 2017/0026218 A1* | 1/2017 | Shattil | H04B 7/026 | |
| 2017/0054480 A1* | 2/2017 | Shattil | H04B 7/026 | |
| 2017/0078915 A1* | 3/2017 | Sun | H04W 28/06 | |
| 2017/0126458 A1* | 5/2017 | Shattil | H04L 27/2628 | |
| 2018/0048365 A1* | 2/2018 | Yoo | H04B 7/0456 | |

FOREIGN PATENT DOCUMENTS

| | | | |
|---|---|---|---|
| KR | 10-2008-0094935 A | 10/2008 | |
| KR | 10-2010-0124329 A | 11/2010 | |
| KR | 101706629 B1 * | 2/2017 | |
| WO | WO-2009050636 A2 * | 4/2009 | H04B 7/0615 |
| WO | WO-2009050636 A3 * | 10/2009 | H04B 7/0615 |

OTHER PUBLICATIONS

Dammann et al., Benefits, variants, and applications of cyclic delay diversity, European Transactions on Telecommunications, Eur. Trans. Telecomms. (2008), 2008, Wiley Interscience, DOI: 10.1002/ett.1308 (Year: 2008).*

Dammann et al., On the Influence of Cyclic Delay Diversity and Doppler Diversity on the Channel Characteristics in OFDM Systems, Jun. 28, 2007, IEEE International Conference on Communications, 2007, IEEE (Year: 2007).*

Kim et al., A Theoretical Treatment of PA Power Optimization in Clippede MIMO-OFDM Systems, Dec. 4, 2009, Global Telecommunications Conference 2009, IEEE, DOI: 10.1109/GLOCOM.2009.5426131 (Year: 2009).*

Li et al., Cyclic Delay Diversity with Discrete Hartley-Fourier Transform in OFDM System, Sep. 23, 2015, 11th International Conference on Wireless Communications, Network and Mobile Computing (WiCOM 2015), IEEE, DOI: 10.1049/cp.2015.0641 (Year: 2015).*

Li et al., On the Optimality of OFDMA MIMO Channels, Nov. 1, 2006, 2006 Fortieth Asilomar Conference on Signals, Systems and Computers (ACSSC '06), IEEE, DOI: 10.1109/ACSSC.2006.355063 (Year: 2006).*

Senthil et al., Interleaving-Based Cyclic Delay Diversity OFDM Systems over Spatially Correlated Channels, Jun. 29, 2012, K.M.M. Circuits Syst Signal Process (2013) 32: 283, DOI: 10.1007/s00034-012-9454-6 (Year: 2012).*

* cited by examiner

METHOD OF CALIBRATING POWER FOR MIMO-OFDM TRANSMITTER

BACKGROUND

The present invention relates to a method of calibrating power for a MIMO-OFDM transmitter, and more particularly, to a method of calibrating power for a MIMO-OFDM transmitter, by which a MIMO-OFDM signal including CDD is simultaneously output through each antenna of the MIMO-OFDM transmitter and a receiving end simultaneously calibrates power for each antenna by using characteristics of the CDD.

As well known in the art, a multi input and multi output orthogonal frequency division multiplexing (MIMO-OFDM) scheme is used to increase a high data rate of a wireless local area network or long term evolution system. Since MIMO, which is a scheme of transmitting/receiving a signal using multiple antennas, has a plurality of antennas constituting a transmission end thereof, power calibration for each transmission antenna must be performed to exactly measure power of each transmission antenna.

In general, the power calibration for a MIMO-OFDM transmitter is performed by measuring the power level of an input signal through measuring equipment such as a spectrum or signal analyzer and controlling a gain such that the difference between the measured power level and a target power level set at the MIMO-OFDM transmitter is constant.

According to the related art, the power calibration for a MIMO-OFDM transmitter is performed by outputting a continuous wave (CW) tone signal or the same signal input and signal out (SISO) signal and measuring the output power level of the corresponding transmission antenna one by a time, that is, measuring the power levels of each antenna in sequence, the more number of transmission antennas is, the more time taken to perform the power calibration is increased in proportion to the number of transmission antennas.

DOCUMENT OF RELATED ART

Patent Document

Patent document 1: Korean Unexamined Patent Publication No. 10-2010-0124329 (Title: Methods and systems for choosing cyclic delays in multiple antenna OFDM systems)

Patent document 2: Korean Unexamined Patent Publication No. 10-2008-0094935 (Title: Method and apparatus for performing uplink transmission in a multiple-input multiple-out signal carrier frequency division multiple access system)

SUMMARY

To solve the problems described above, an object of the present invention is to provide a method of calibrating power for a MIMO-OFDM transmitter which is capable of simultaneously performing the power calibration of all antennas by allowing a MIMO-OFDM signal including a cyclic delay diversity (CDD) to be simultaneously output from each antenna of the MIMO-OFDM transmitter and using characteristics of the CDD at a receiving end.

According to an embodiment, there is provided a method of calibrating power for a MIMO-OFDM transmitter, which includes: receiving a CDD delay signal output from the MIMO-OFDM transmitter to obtain a starting point of a frame of a corresponding signal; performing an FFT on a sample preceded from the starting point of the frame by an extent of a maximum CDD delay; calculating a channel coefficient H(n) by using an FFT calculated training symbol Y(n) and an ideal training symbol X(n); calculating a channel impulse response h(k) by IFFT calculating the channel coefficient H(n) to calculate power p(k) of the channel impulse response; converting CDD delay values of each MIMO transmission antenna into values in units of samples by using a sampling rate in the channel impulse response; mapping a position of a power peak point of the channel impulse response to each MIMO transmission antenna by using the CDD delay value; and performing power calibration of each MIMO transmission antenna based on each peak point power of the MIMO transmission antennas at a time.

The channel coefficient is obtained by $$H(n) = \frac{Y(n)}{X(n)}, n = 0, 1, 2, \cdots, FFT\ size - 1$$

The channel impulse response h(k) and the power p(k) thereof are obtained by $$h(k) = IFFT\{H(n)\}, k=0,1,2,\ldots,FFT\ size-1\ \text{and}$$

$$P(k) = real(h(k))*real(h(k)) + imag(h(k))*imag(h(k)),\ k=0,1,2,\ldots,FFT\ size-1.$$

According to the method of calibrating power for a MIMO-OFDM transmitter, the power calibration is simultaneously performed by allowing the MIMO-OFDM signal including CDD to be simultaneously output from each antenna of the MIMO-OFDM transmitter and using the characteristics of CDD at the receiving end, so that the time taken to calibrate power may be greatly reduced.

DETAILED DESCRIPTION OF THE EMBODIMENTS

Hereinafter, a method of calibrating power for a MIMO-OFDM transmitter according to a preferable embodiment of the present invention will be described in detail with reference to accompanying drawings.

Figure 1:
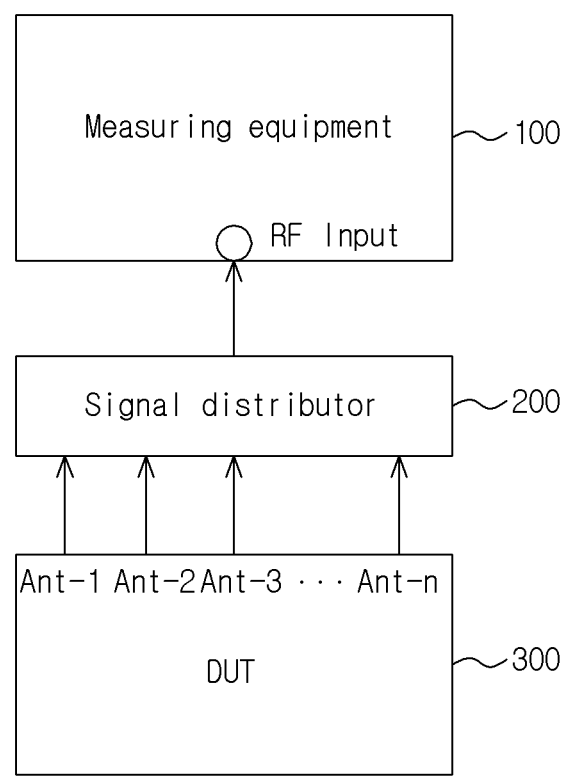
FIG. 1 is a block diagram illustrating a system for calibrating power for a MIMO-OFDM transmitter according to the present invention.

FIG. 1 is a block diagram illustrating a system for calibrating power for a MIMO-OFDM transmitter according to the present invention. As shown in FIG. 1, for example, the system for calibrating power for a MIMO-OFDM transmitter according to the present invention may substantially include user equipment, a macro base station or a device under test (DUT) 300 supporting MIMO, measuring equipment 100 such as a spectrum analyzer or a signal analyzer, and a signal distributor 200 for connecting the measuring equipment 100 and the DUT 300.

In the system described above, MIMO transmission antenna ports Ant-1, Ant-2, . . . , Ant-n of the DUT 300 are wire connected to input ports of the signal distributor 200, respectively. An output port of the signal distributor 200 is wire connected to an RF input port of the measuring equipment 100. In this case, the DUT 300 transmits delayed CDD signals through the transmission antenna ports Ant-1, Ant-2, . . . , Ant-n at the same time, and the measuring equipment 100 performs power calibration after simultaneously receiving the signals transmitted from the DUT 300 through the RF input port.

Figure 2:
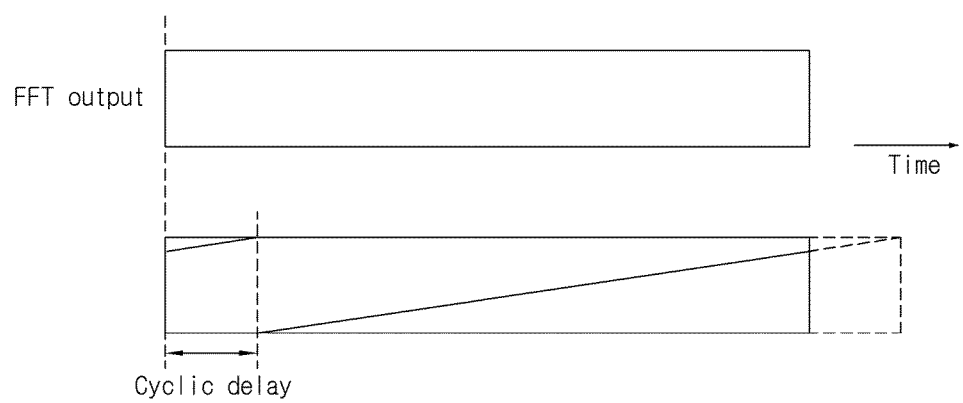
FIG. 2 is a view illustrating a CDD principle applied to a conventional MIMO-OFDM transmitter.

FIG. 2 is a view illustrating a CDD principle applied to a conventional MIMO-OFDM transmitter. As shown in FIG. 2, the CCD scheme is a scheme of increasing a diversity gain by assigning predetermined delay time periods to antennas, respectively. Since the cyclic delay in time domain causes a phase shift between subcarriers in frequency domain, the correlation between the subcarriers is reduced so that the diversity gain may be obtained in a simple manner, so the CDD scheme has been applied to many OFDM systems.

Figure 3:
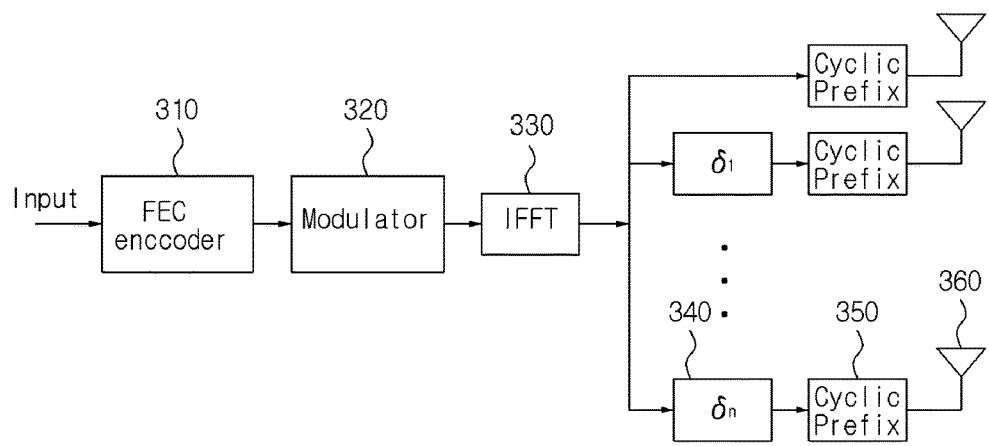
FIG. 3 is a block diagram illustrating units constituting the MIMO-OFDM to which CDD is applied.

FIG. 3 is a block diagram illustrating units constituting the MIMO-OFDM to which CDD is applied. As shown in FIG. 3, the MIMO-OFDM transmitter to which CDD is applied includes a forward error correlation (FEC) encoder 310, a modulator 320, an IFFT calculator 330, a plurality of delays 340, a plurality of cyclic prefix (CP) inserters 350 and a plurality of antennas 360.

In the configuration described above, the encoder 310 encodes transmitting data at a coding rate to output coded symbols. The modulator 320 modulates the data from the encoder 310 according to a give modulation scheme and outputs the modulated symbols. The IFFT calculator 330 performs an IFFT operation on the data from the modulator 320 to output sample data. Next, the delays 340 cyclically delay the sample data for a predetermined time period, respectively. Each of the CP inserters 350 inserts a cyclic prefix into the sample data from the corresponding delay 340 and transmits the CP-inserted sample data through the corresponding antenna 360.

Figure 4:
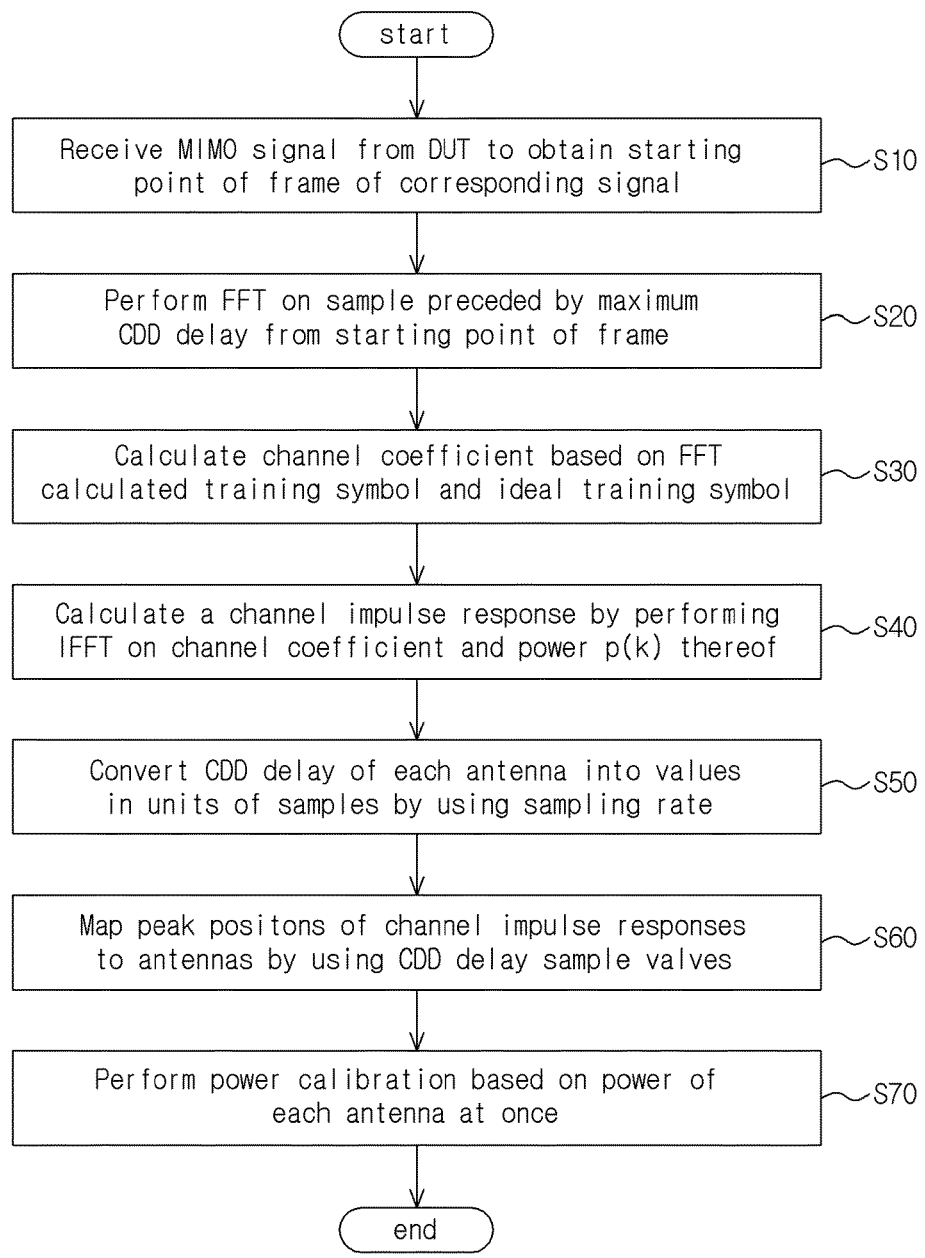
FIG. 4 is a flowchart illustrating a method of calibrating power for a MIMO-OFDM according to the present invention.
Figure 5:
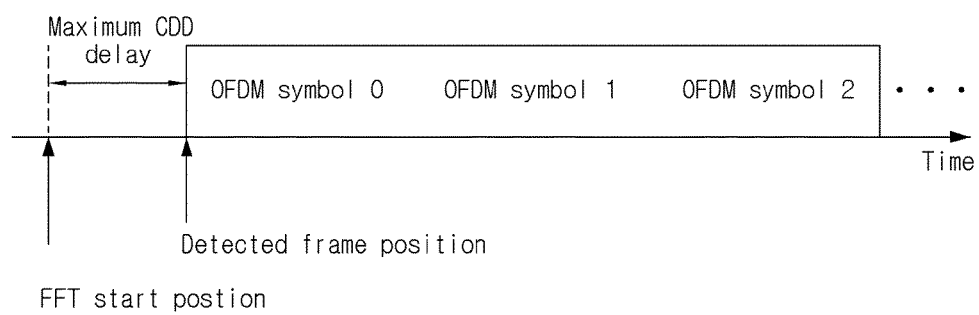
FIG. 5 is a timing chart illustrating an FFT start position for power calibration according to the method of calibrating power for a MIMO-OFDM transmitter of the present invention.

FIG. 4 is a flowchart illustrating a method of calibrating power for a MIMO-OFDM according to the present invention. As shown in FIG. 4, according to the method of calibrating power for a MIMO-OFDM transmitter, in the system shown in FIG. 1, the measuring equipment 100 receives a MIMO signal from the DUT 300 to obtain a starting point of a frame of a corresponding signal in step S10. Next, in step S20, FFT is performed on the sample preceded from the starting point of the frame obtained by extent of the maximum CDD delay in step S10. FIG. 5 is a timing chart illustrating an FFT start position for power calibration according to the method of calibrating power for a MIMO-OFDM transmitter of the present invention. Meanwhile, values specified in the standard are utilized as the CDD delay values of each transmission antenna.

In step S30, a channel coefficient H(n) is calculated by using the FFT calculated training symbol Y(n) and an ideal training symbol X(n) as following Equation 1.

$$H(n) = \frac{Y(n)}{X(n)}, n = 0, 1, 2, \cdots, FFT \text{ size} - 1 \quad \text{[Equation 1]}$$

Next, in step S40, a channel impulse response h(k) is calculated by IFFT calculating the channel coefficient H(n) calculated in step S30 as following Equation 2 and then, power p(k) of the channel impulse response (h) is calculated as following Equation 3.

$$h(k) = \text{IFFT}\{H(n)\}, k=0,1,2,\ldots,\text{FFT size}-1 \quad \text{[Equation 2]}$$

$$P(k) = \text{real}(h(k))^*\text{real}(h(k)) + \text{imag}(h(k))^*\text{imag}(h(k)),$$
$$k=0,1,2,\ldots,\text{FFT size}-1 \quad \text{[Equation 3]}$$

Figure 6:
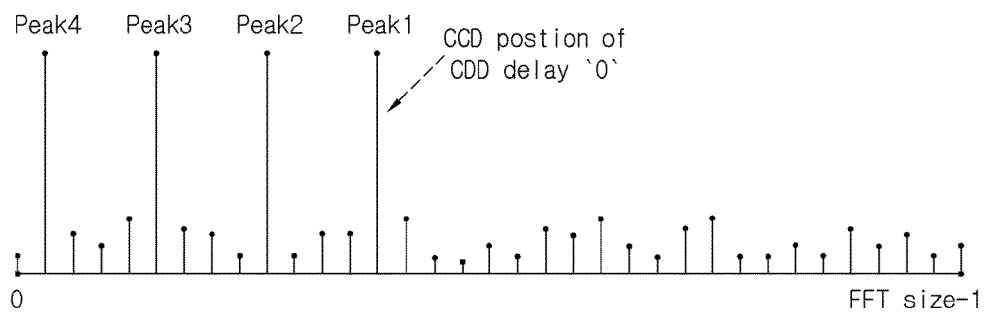
FIG. 6 is an exemplary power graph illustrating a channel impulse response transmitted for four transmission antennas according to the method of calibrating power for a MIMO-OFDM transmitter of the present invention.

FIG. 6 is an exemplary power graph illustrating a channel impulse response transmitted for four transmission antennas according to the method of calibrating power for a MIMO-OFDM transmitter of the present invention.

Meanwhile, since the MIMO-OFDM signal received by the measuring equipment 100 is the sum of several signals obtained by applying CDD to the same signal, that is, delaying the same signal, the power P of the channel impulse response h has the forms shown in FIG. 6. In this case, the sampling resolution is 1/fs (where fs is a sampling rate). In step S50, by applying it and using the sampling rate fs, the CDD delay values of each transmission antenna are converted into values in units of samples as following Equation 4.

$$CDD \text{ delay sample of antenna} = \frac{CDD \text{ delay (sec) of antenna}}{fs \text{ (Hz)}} \quad \text{[Equation 4]}$$

Meanwhile, since FFT is performed on the sample preceded by from the starting point by extent of the maximum CDD delay in step S20 after the frame position is detected, the peak position of CDD delay '0' is the rightmost peak point (Peak 1) in FIG. 6. Thus, in step S60, peak point positions (Peak 2, Peak 3 and Peak 4 in FIG. 6) of channel impulse responses are mapped to the transmission antennas by using the CDD delay sample values of each transmission antenna obtained in step S50.

In this case, since the power in frequency domain is equal to that in time domain, as a result, the powers of each peak point positions Peak 1 to Peak 4 of the channel impulse responses h in FIG. 6 are equal to the powers of MIMO-OFDM symbols of the transmission antennas of the DUT 300. Thus, in step S70, based on the powers of each transmission antennas of the DUT 300, the power calibration for the MIMO-OFDM transmitter may be performed at each peak point position of the channel impulse responses h, so that the time taken to perform the power calibration may be effectively reduced.

The method of calibrating power for a MIMO-OFDM described with reference to accompanying drawings in this disclosure is for an illustrative purpose only, and the present invention is not limited thereto. Thus, it should be understood that numerous other modifications and embodiments can be devised by those skilled in the art within the spirit and scope of the present invention and they will fall within the scope of the present invention.

What is claimed is:

1. A method of calibrating power for a multiple input and multiple output-orthogonal frequency division multiplexing (MIMO-OFDM) transmitter having a plurality of antennas via a measurement equipment coupled to the MIMO-OFDM transmitter, the method comprising:

receiving, via the measurement equipment, a cyclic delay diversity (CDD) signal which is cyclically delayed for a predetermined time period and simultaneously output from the MIMO-OFDM transmitter to obtain a starting point of a frame of a corresponding signal;

performing, via the measurement equipment, a fast Fourier transform (FFT) on a sample preceded by a maximum CDD delay from the starting point of the frame;

calculating, via the measurement equipment, a channel coefficient H(n) by using an FFT calculated training symbol Y(n) and an ideal training symbol X(n), wherein n=0, 1, 2, . . . ;

calculating, via the measurement equipment, a channel impulse response h(k) by performing an inverse fast Fourier transform (IFFT) on the channel coefficient H(n) and calculating a power p(k) of the channel impulse response, wherein k=0, 1, 2, . . . ;

converting, via the measurement equipment, CDD delay values of each antenna into CDD delay sample values by using a sampling rate in the channel impulse response;

mapping, via the measurement equipment, a peak point position of the channel impulse response to each antenna by using the CDD delay sample values; and simultaneously performing, via the measurement equipment, a power calibration of each antenna based on each peak point power of the plurality of antennas.

2. The method of claim 1, wherein the channel coefficient H(n) is obtained by $$H(n) = \frac{Y(n)}{X(n)}, n = 0, 1, 2, \cdots, FFT\ size - 1.$$

3. The method of claim 1, wherein the channel impulse response h(k) and the power p(k) thereof are obtained by $h(k)=\text{IFFT}\{H(n)\}, k=0,1,2,\ldots,\text{FFT size}-1$ and $P(k)=\text{real}(h(k))*\text{real}(h(k))+\text{imag}(h(k))*\text{imag}(h(k)), k=0,1,2,\ldots,\text{FFT size}-1.$ 4. The method of claim 2, wherein the channel impulse response h(k) and the power p(k) thereof are obtained by $h(k)=\text{IFFT}\{H(n)\}, k=0,1,2,\ldots,\text{FFT size}-1$ and $P(k)=\text{real}(h(k))*\text{real}(h(k))+\text{imag}(h(k))*\text{imag}(h(k)), k=0,1,2,\ldots,\text{FFT size}-1.$

* * * * *